US009554392B2

(12) United States Patent
Shaw et al.

(10) Patent No.: US 9,554,392 B2
(45) Date of Patent: Jan. 24, 2017

(54) MACHINE TO MACHINE TRAFFIC MANAGEMENT METHODS AND SYSTEMS

(71) Applicants: AT&T Intellectual Property I, LP, Atlanta, GA (US); AT&T Mobility II LLC, Atlanta, GA (US)

(72) Inventors: Venson Shaw, Kirkland, WA (US); Emily Soelberg, Atlanta, GA (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 14/515,004

(22) Filed: Oct. 15, 2014

(65) Prior Publication Data

US 2016/0113025 A1    Apr. 21, 2016

(51) Int. Cl.
*H04W 72/00* (2009.01)
*H04W 72/10* (2009.01)
*H04W 4/00* (2009.01)
*H04W 72/08* (2009.01)

(52) U.S. Cl.
CPC ............ *H04W 72/10* (2013.01); *H04W 4/005* (2013.01); *H04W 72/087* (2013.01)

(58) Field of Classification Search
USPC .... 455/450, 63.2, 509, 464, 451, 452.2, 453
See application file for complete search history.

(56) References Cited

U.S. PATENT DOCUMENTS

| 7,680,478 | B2 | 3/2010 | Willars et al. |
| 8,638,724 | B1 | 1/2014 | Knoop et al. |
| 8,660,078 | B2 | 2/2014 | Song et al. |
| 8,737,989 | B2 | 5/2014 | Luft |
| 2007/0121542 | A1* | 5/2007 | Lohr ................. H04L 12/5693 370/329 |
| 2009/0046735 | A1* | 2/2009 | Regnier ................. H04L 47/10 370/412 |
| 2010/0150120 | A1 | 6/2010 | Schlicht et al. |
| 2010/0254387 | A1 | 10/2010 | Trinh et al. |
| 2012/0106428 | A1 | 5/2012 | Schlicht et al. |
| 2012/0117140 | A1 | 5/2012 | Wang et al. |

(Continued)

FOREIGN PATENT DOCUMENTS

| CN | 102638866 A | 8/2012 |
| CN | 103442328 A | 12/2013 |

(Continued)

OTHER PUBLICATIONS

Delgado-Luque, et al., "Evaluation of Latency-Aware Scheduling Techniques for M2M Traffic Over LTE", Aug. 27, 2012, 989-993.

(Continued)

*Primary Examiner* — Vladimir Magloire
*Assistant Examiner* — Sayed T Zewari
(74) *Attorney, Agent, or Firm* — Baker & Hostetler LLP

(57) ABSTRACT

A method and system for managing M2M traffic in a network is provided. The M2M device sends a message that includes a machine identity for the M2M device. A query is submitted to a database that correlates the machine identity with a QoS parameter or a priority. The message is assigned to one of a plurality of input queues based on the assigned QoS parameter or priority. Each input queue is associated with a delay period so that the message is held in the queue for a period less than the delay period.

12 Claims, 9 Drawing Sheets

(56) References Cited

U.S. PATENT DOCUMENTS

| | | |
|---|---|---|
| 2012/0265818 A1 | 10/2012 | Van et al. |
| 2013/0016657 A1* | 1/2013 | Muhanna .............. H04W 4/005 370/328 |
| 2013/0051326 A1 | 2/2013 | Jeyatharan et al. |
| 2013/0179583 A1 | 7/2013 | Foti |
| 2013/0242867 A1 | 9/2013 | Bell |
| 2013/0297744 A1 | 11/2013 | Foti |
| 2013/0329653 A1 | 12/2013 | Russell et al. |
| 2013/0336111 A1 | 12/2013 | Vos et al. |
| 2013/0339438 A1 | 12/2013 | Cherian et al. |
| 2014/0050085 A1 | 2/2014 | Hong et al. |
| 2014/0213277 A1 | 7/2014 | Jang |
| 2014/0226641 A1 | 8/2014 | Kim |

FOREIGN PATENT DOCUMENTS

| | | |
|---|---|---|
| EP | 2392182 A1 | 12/2011 |
| KR | 20130129835 A | 11/2013 |
| WO | WO 2012080414 A2 | 6/2012 |
| WO | WO 2012136005 A1 | 10/2012 |
| WO | WO 2012167807 A1 | 12/2012 |
| WO | WO 2014058113 A1 | 4/2014 |

OTHER PUBLICATIONS

Gotsis, et al., "Analytical Modelling and Performance Evaluation of Realistic Time-Controlled M2M Scheduling Over LTE Cellular Networks", Feb. 2, 2013, 11 pgs.

Lam, et al., "Congestion Control for M2M Traffic with Heterogeneous Throughout Demands", IEEE Letters, 2013, 1452-1457.

Lien, et al., "Massive Access Management for QoS Guarantees in 3GPP Machine-to-Machine Communications", IEEE Letters, 15(3), Mar. 2011, 311-313.

Niyato, et al., "Machine-to-machine Communications for Home Energy Management System in Smart Grid", IEEE Letters, 49(4), 2011, 53-59.

Zhang, et al., "Home M2M Networks: Architectures, Standards, and QoS Improvement", IEEE Letters, Apr. 2011, 44-52.

* cited by examiner

US 9,554,392 B2

MACHINE TO MACHINE TRAFFIC MANAGEMENT METHODS AND SYSTEMS

BACKGROUND OF THE INVENTION

The subject matter disclosed herein generally relates to communications involving wireless devices and more particularly to methods and systems for managing differentiated wireless device traffic such as machine to machine (M2M) traffic to manage network performance.

The rapid development of telecommunications technologies has allowed providers of a wide range of services to manage and control devices remotely. M2M devices communicate with other devices and/or systems of similar capabilities. M2M devices have applications in a variety of service areas including security, tracking and tracing, payment, health, remote maintenance and control, metering, and consumer devices. Examples of M2M type devices include temperature sensors, water meters, electric meters, gas meters, automotive navigation aids, emergency notification, digital billboards, or the like. Typically, an M2M device acquires information (e.g., temperature, utility usage, documents, etc.) and provides the information to another device via a network. Because of the large number of potential applications, M2M is expanding at an unprecedented pace, and it is forecasted that through exponential growth there will be 50 billion devices by 2020. Due to the increasing number of M2M devices entering the marketplace and the resulting traffic, it is likely that network congestion may occur.

A typical cellular network includes a radio access network and a core network. The key core network components are a database of device locations and security keys and the "front end workers" that are the computers/servers in front of it to allow many transactions per second. The core network is designed for the rapid response needed for making synchronous voice calls. Much of the cost of network elements like the Home Location Register/Home Subscriber Service (HLR/HSS) is driven by the low latency required to connect to the network and the network locating the other party. This all happens within milliseconds. The lower the latency needs, the more front end worker resources that must be applied.

Currently all M2M traffic is treated equally, which results in network congestion when massive numbers of machines are attempting to communicate with each other simultaneously. Consequently, today there is a single "quality" level at the core network. However, not all M2M communications require the same Quality of Service (QoS) as synchronous voice communications, in that M2M communications may have a higher latency tolerance than synchronous voice communications.

Services like voice calls require high QoS via low latency. Video has high data throughput requirements. These needs have driven the development of network air interface bearers and the ability to assign the resources to ensure service experiences. The maturity of QoS is around allocation of the scarce radio access network resources of which are primarily spectrum. With M2M traffic there is often a high tolerance for latency to transmit very small amounts of data. However, the macro cellular network is dimensioned to be able to support high QoS services like voice and video. Even though M2M devices may use very little throughput meaning they do not consume much of the scarcest resource of spectrum, overall costs to operate an M2M network are high, partly driven by the bottleneck (and cost) moving into the core network. Therefore, there is a need for methods and systems to manage M2M traffic in a way that reduces network congestion. There is a need for a method and system to manage M2M traffic based on the QoS requirements and latency needs of M2M devices.

BRIEF DESCRIPTION OF THE INVENTION

The disclosure provides a solution to the problem of network congestion resulting from M2M traffic. This solution proposes a good/better/best approach for M2M QoS that relies on latency tolerance at the home subscriber server. For devices that could tolerate several seconds delay, messages could be routed to a system with fewer front end worker resources. For those that needed higher quality, they could go to a system with more front end worker resources.

In accordance with one exemplary non-limiting embodiment, the invention relates to a method for managing M2M traffic that includes the steps of receiving a message request from a first device. The message request includes a machine identity for the first device. A query is submitted to a database that correlates the machine identity with a QoS parameter. The method then determines the QoS parameter associated with the first device based on the machine identity and assigns an assigned priority to the message. The assigned priority is selected from at least a first priority and a second lower priority based on the first QoS parameter. The method further includes the step of assigning the message to an assigned input queue based on the assigned priority. The assigned input queue is selected from among a first input queue having a first associated delay into which a set of first priority messages are assigned and a second input queue having a second associated delay into which a set of second priority messages are assigned.

In another embodiment, a system is provided having a computer, a storage medium, and a node that receives a request to transmit a message from a first device, the message request including a machine identity for the first device. The system also includes a subsystem that determines the machine identity for the first device. A database is stored in the storage medium. The database stores information associating the machine identity with a QoS parameter. A subsystem that determines the QoS parameters for the first device based on the machine identity is also included. The system also includes a subsystem that assigns an assigned priority for the message based on the QoS parameter where the assigned priority is selected from among a first priority and a second lower priority. The system also includes a subsystem that assigns the message to an assigned input queue based on the assigned priority. The assigned input queue is selected from among a first input queue having a first associated delay into which a first set of assigned messages having the first priority are assigned and a second input queue having a second associated delay into which a second set of assigned messages having the second lower priority are assigned.

In another embodiment, a method includes receiving a request to send a message from a first machine to a second machine. The method includes the step of receiving a first QoS identifier from the first machine; wherein the first QoS identifier includes a priority and a QoS parameter. The method also includes the step of assigning the message to an assigned input queue. The assigned input queue is selected from at least a first input queue and a second input queue based on the priority of the first QoS identifier. The first input queue has a first associated delay into which a set of first priority messages are assigned and the second input queue has a second associated delay into which a set of second priority messages are assigned.

BRIEF DESCRIPTION OF THE DRAWINGS

Other features and advantages of the present invention will be apparent from the following more detailed description of the preferred embodiment, taken in conjunction with the accompanying drawings which illustrate, by way of example, the principles of certain aspects of the invention.

DETAILED DESCRIPTION OF THE INVENTION

Figure 1:
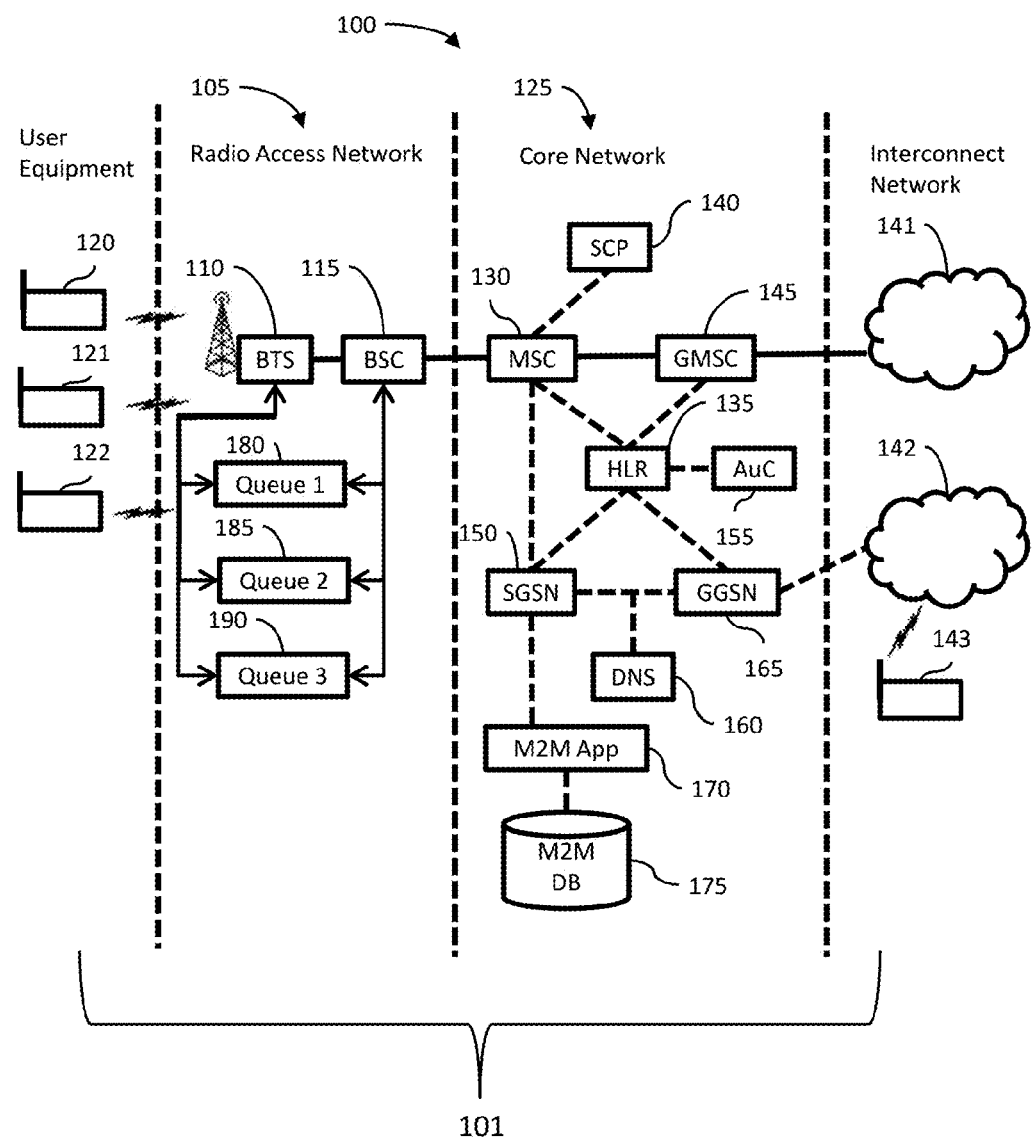
FIG. 1 is a schematic of some elements of a traffic management system in accordance with one embodiment of the invention.

Illustrated in FIG. 1 is an illustrative embodiment of an M2M traffic management system 100 for use with a network 101, such as, for example a cellular network. The M2M traffic management system 100 may be implemented in a variety of netwrok types such as WiFi, BlueTooth, wireline, cellular, etc. In the case of a cellular network, network 101 may be a cellular network operating under a Global System for Mobile Communication (GSM) standard, a Long-Term Evolution (LTE) standard, or in a Universal Mobile Telecommunications System (UMTS) standard. Although only three of the commonly used standards are described herein it would be apparent to one of ordinary skill in the art that the M2M traffic management system 100 may also be used with cellular networks operating on new standards such as the contemplated 5G standards. The M2M traffic management system 100 may include radio access network (RAN) 105 that is the part of the network responsible for having physical radio connectivity for users. The RAN 105 may include a plurality of base stations (BTS) 110 (only one is shown) (Node B in UMTS terminology, base transceiver station in GSM terminology). The primary task of BTS 110 is to handle physical layer functions and perform basic radio resource management operations. Also included in the M2M traffic management system 100 may be a Base Station Controller (BSC) 115 (or A Radio Network Controller (RNC) in the case of UMTS network). In LTE, the controller and base station functions are combined in an Enhanced Node B (eNodeB). The BSC 115 allocates radio channels and controls handovers from BTS 110. BSC 115 acts as a concentrator where many different low capacity connections to BTSs having relatively low utilization level are reduced to a smaller number of connections towards a mobile switching center (MSC) 130 having a higher utilization level.

The M2M traffic management system 100 may service a plurality of mobile stations (MS 120, MS 121 and MS 122) (or User Equipment (UE) in UMTS and LTE terminology). MS 120 may be a mobile telephone, a personal digital assistant, a computer, a tablet, or an M2M device with GSM (or UMTS, or LTE) capability. Each MS, e.g. MS 120 has associated with it a machine identity. For example, the MS 120 has an International Mobile Station Equipment identity or IMEI. The IMEI is a number that identifies the MS 120 and is used by a GSM network to identify valid devices. Another machine identity may be the MSISDN that is a number uniquely identifying a subscription in a GSM or UMTS mobile network. Yet another machine identity may be a serial number of the MS 120. The M2M traffic management system 100 may include an arbitrary number of certain entities (e.g., MS 120, BTS 110, BSC 115) shown in FIG. 1. Moreover, for the sake of simplicity, FIG. 1 omits certain entities (e.g., operations and maintenance center, and business systems).

The M2M traffic management system 100 may also include a core network 125. The core network 125 performs switching for calls involving for example a GSM network. The main component of the core network 125 is the mobile switching center (MSC) 130 which operates in conjunction with a home location register (HLR) 135. The HLR 135 is a database that stores information about subscribers in the M2M traffic management system 100. The MSC 130 is a server mostly associated with communications switching functions, such as registration, authentication, location updating, call set-up, release, and routing. However, it may also provide other functions such as routing SMS messages, conference calls, fax, and service billing as well as interfacing with other networks, such as the public switched telephone network (PSTN). The MSC 130 is structured so that base stations such as BTS 110 connect to it, while it connects to the public switched telephone network (PSTN). All forms of communication, including M2M communications travel through the MSC 130.

As illustrated in FIG. 1 the core network 125 may include, in addition to MSC 130, a Service Control Point (SCP) 140, a gateway MSC 145, a service GPRS support node (SGSN 150), a Home Location Authentication Center (AuC) 155, a Domain Name Server (DNS) 160, and a Gateway GPRS support node (GGSN) 165. M2M traffic management system 100 may also comprise a host of various networks and other network elements.

Associated with the MSC 130 may be an M2M traffic application 170 and an M2M database 175. M2M database 175 associates a QoS and a priority with the machine identity of an MS 120. The M2M traffic application 170 determines the QoS and priority associated with the MS 120 and assigns a priority to a message. The M2M database 175 and the M2M traffic application 170 may be located within or outside of the core network 125. In one embodiment the M2M traffic application 170 and the M2M database 175 may be located outside the core network to avoid bottlenecks at the MSC 130.

The M2M traffic management system 100 may be connected to one or more external networks such as networks 141, and 142. Networks 141 and 142 may be connected to a mobile station 143 such as a personal digital assistant, a computer, a tablet computer, or an M2M device. The mobile station 143 may be connected to networks 141 and 142 using a variety of technologies such as Wi-Fi, Bluetooth, ANT, ZigBee, IEEE802.15.4, among others. The M2M traffic management system 100 in this embodiment would be used to manage traffic between the mobile station 143 connected to networks 141 and 142 and devices connected to a cellular network. In this embodiment the M2M traffic management system 100 serves as a gateway for M2M communications using different protocols and air interfaces.

The M2M traffic management system 100 may also include a plurality of input queues (storage structures in memory), for example, a first input queue 180, a second input queue 185 and a third input queue 190. The input queues are used to store messages for a predetermined period of time. First input queue 180, second input queue 185 and third input queue 190 may be located at an access node in the RAN 105. These queues could be sub-system partitions. First input queue 180, second input queue 185 and third input queue 190 store the messages that need to be transmitted eventually. For example, a first message in the first input queue (for messages with higher priority) 180 may be transmitted before a second message in the second input queue 185 (for messages with lower priority) even though the first message was received after the second message. Although three input queues are illustrated in the example of FIG. 1 it will be understood by one of ordinary skill in the art that any number of queues may be employed. Alternately, messages in the second input queue 185 and the third input queue 190 may be routed to a system with fewer front end worker resources or to a smaller core network 125.

Associated with each input queue are a priority level and a predetermined delay. For example first input queue 180 may be associated with a low priority and has a long delay (of between, for example, greater than 400 ms) such that an M2M message will be postponed and not delivered immediately. Second input queue 185 may be associated with a medium priority and may have a medium delay (of between, for example, 100 ms and 400 ms) such that an M2M message will be postponed briefly and then delivered. Third input queue 190 may have high priority and may have a short delay (for example between 0 ms and 150 ms) such that the M2M message will not be postponed significantly and will be delivered almost immediately.

In operation, an MS 120 may be a machine that seeks to communicate with a second machine MS 121. MS 120 would send a machine identity to the RAN 105 which communicates the first machine identity to the core network 125. In the core network 125 there is an M2M database 175 that associates the machine identity with one or more QoS parameters. Although the M2M database 175 is described in this embodiment as being located in the core network 125, it would be apparent to one of ordinary skill in the art that the M2M database 175 may be located at any location in communication with the RAN 105.

The M2M database 175 may also assign each machine identity with a priority. The M2M traffic application 170 will assign a priority to the message based on the QoS parameters for the MS 120. The MSC 130 in the core network 125 receives the priority from the M2M traffic application 170 and communicates the priority to the BSC 115 (or an RNC or an eNodeB). BSC 115 will assign the message to an input queue based on the priority. Associated with each input queue is a delay that delays transmission of the message for a predetermined period of time.

The assignment of a message to a particular input queue depends on how delay sensitive the traffic is—conversational and streaming traffic are more delay sensitive, interactive and background are less so. Because of the less restrictive delay requirements when compared to conversational and streaming classes, both interactive and background classes provide better error rates. Conversational voice and video and interactive games are delay sensitive and have a delay requirement of much less than 1 second. Voice messaging, e commerce and web browsing applications are less delay sensitive and have a delay requirement of approximately 1 second. Streaming audio and video have delay requirements of less than 10 seconds while fax and email arrival notification may have delay requirements of greater than 10 seconds.

For example, a first machine with high latency such as an electric meter may need to communicate with a second machine through a cellular network. The cellular network may be transmitting a large number of different types of messages such as for example conversational and streaming messages, voice messaging messages, streaming audio and video messages, and fax and email messages. Conversational and streaming messages may be assigned a high priority and assigned to a first input queue 180 having a delay of for example between 0 ms and 150 ms. Messages from the first machine may be assigned an intermediate priority and assigned to a second input queue having a delay of for example between 100 ms and 400 ms. Messages from the first machine may be assigned a low priority and assigned to a third input queue 190 having a third delay of for example greater than 400 ms. The message from the electric meter will be held in the third input queue for the period of the third delay or until there is sufficient capacity to send the message and the messages in the first input queue 180 and the second input queue 185 have been sent. Alternately, messages from the second input queue may be sent to a to a system with fewer front end worker resources, or a core networks with spare capacity. Input queues may be managed with a scheduling algorithm such as first in first out (FIFO) or any other suitable scheduling algorithm.

Figure 2:
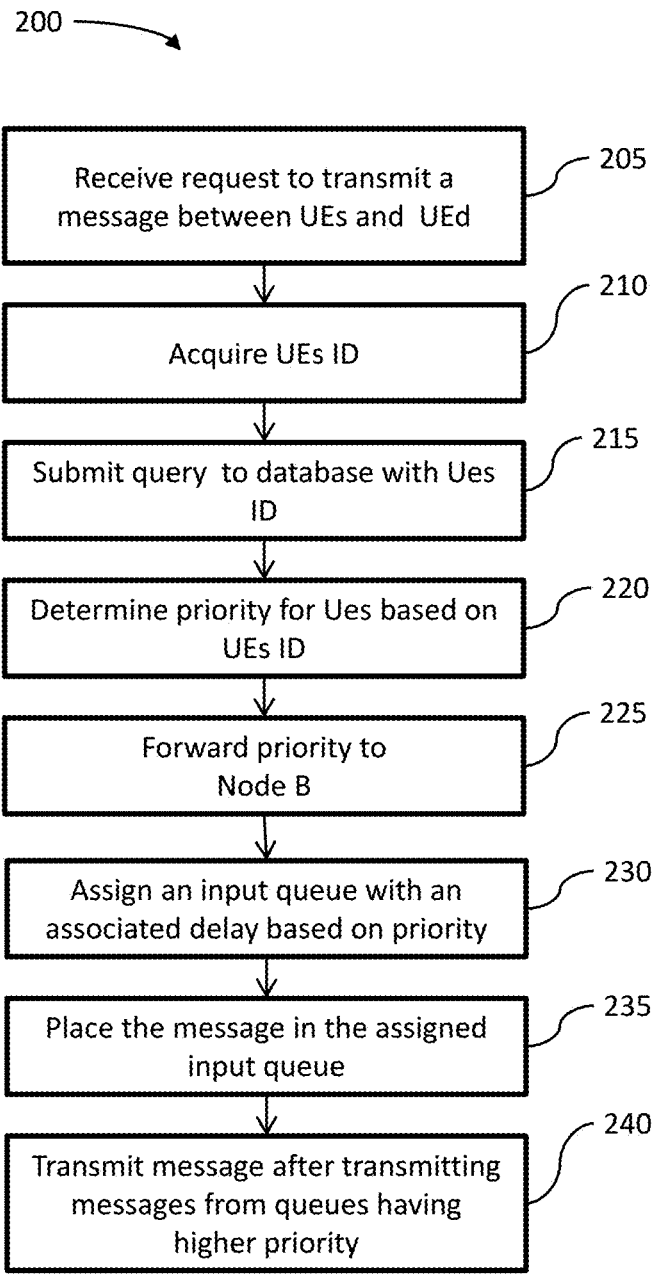
FIG. 2 illustrates a non-limiting exemplary method of implementing one or more disclosed embodiments.

Illustrated in FIG. 2 is an embodiment of a method 200 for managing M2M traffic in a cellular network.

In step 205, the method 200 receives a request to transmit a message between a source machine and a destination machine.

In step 210, the method 200 acquires a machine identity for the source machine and the destination machine.

In step 215, the method 200 submits a query to the database, the query including the source machine identity and destination machine identity.

In step 220, the method 200 determines a priority for the source machine and destination machine based on the source machine identity.

In step 225, the method 200 forwards the priority information to a network access point (e.g. BSC 115 or eNodeB).

In step 230, the method 200 instructs the BSC 115 to assign the message to an input queue selected from among at least a first input queue for messages with a high priority and a second input queue for messages with a lower priority based on the priority of the source machine. Messages in the first input queue may have a short delay before being transmitted while messages in the second input queue may have a longer delay before being transmitted.

In step 235, the method 200 places the message in the assigned input queue.

In step 240, the method 200 instructs the transmission of the message after transmitting messages from queues having higher priority. Alternately, the transmission of the message may be routed to a system with fewer front end worker resources.

For example, in the case where the source machine is a meter, and the destination machine is a server, the message may be assigned a low priority and routed through a third input queue, where the rules for the input queue are to hold the message up to a relatively long (>2 seconds) predetermined period of time (delay) or until messages in the first input queue and second input queue have been transmitted and there is sufficient capacity available to send the message. In a case where the source machine is a game console the message may be assigned a high priority and routed through the first input queue, where the rules for the input queue are to hold the message for a relatively short period of time (<150 ms) (delay) and the messages may be sent on a first in first out basis. If the residence time of a message in a queue exceed the delay associated with the queue then the message may be dropped.

Figure 3:
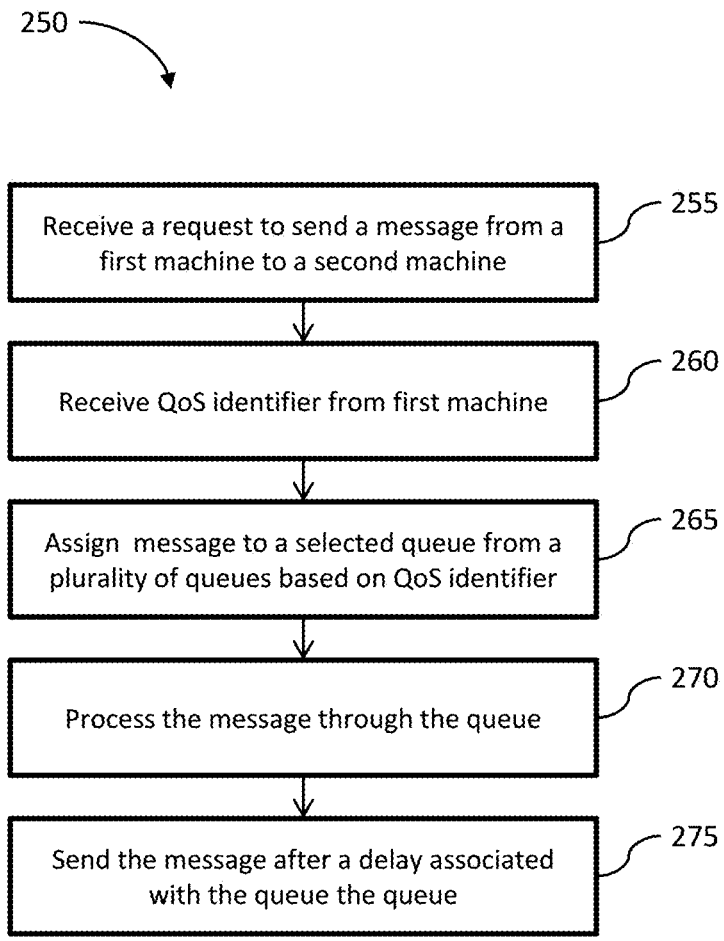
FIG. 3 illustrates a non-limiting exemplary alternate method of implementing one or more disclosed embodiments.

Illustrated in FIG. 3 is another embodiment of a method 250 for machine to machine traffic management. In this embodiment each machine is associated with a priority parameter which is in turn associated with a QoS requirement for the machine. For example, a machine with a low latency tolerance may be provided with a high priority parameter and a machine with a high latency tolerance may be provided with a low priority parameter.

In step 255 the method 200 receives a request to send a message from a first machine to a second machine.

In step 260 the method 200 receives the priority parameter from the first machine.

In step 65 the method 200 assigns the first machine to a first selected input queue from a plurality of input queues based on the priority parameter of the first machine. Each of the plurality of input queues is associated with a priority and a delay. For example a first queue may be associated with a high priority and has a short delay (of between, for example, 0 ms and 150 ms) such that an M2M message will be delivered immediately. The messages in a queue may be delivered on a FIFO basis. A second queue may be associated with a medium priority and may have a medium delay (of between, for example, 100 ms and 400 ms) such that an M2M message will be postponed briefly and then delivered. The messages in the second queue may be delivered on a FIFO basis. A third input queue may be associated with a low priority and may have a long delay (for example between greater than 400 ms) such that the M2M message will be postponed for at most the period of the long delay and will be delivered after all messages in the first input queue and the second input queue have been delivered. Alternately, the messages in the second and third input queues may be delivered to alternate system with fewer front end worker resources.

In step 275 the method 200 transmits the message from the selected input queue.

Various scheduling policies can be used at queuing nodes. In FIFO, messages are served one at a time and the message that has been waiting the longest is served first. The M2M traffic management system 100 has the advantage that all the M2M traffic is not treated "equal." It provides the ability to leverage QoS and/or priority handling to manage massive M2M traffic. The result is that the cellular network will not become significantly overloaded when massive numbers of M2M devices communicate with each other.

Figure 4:
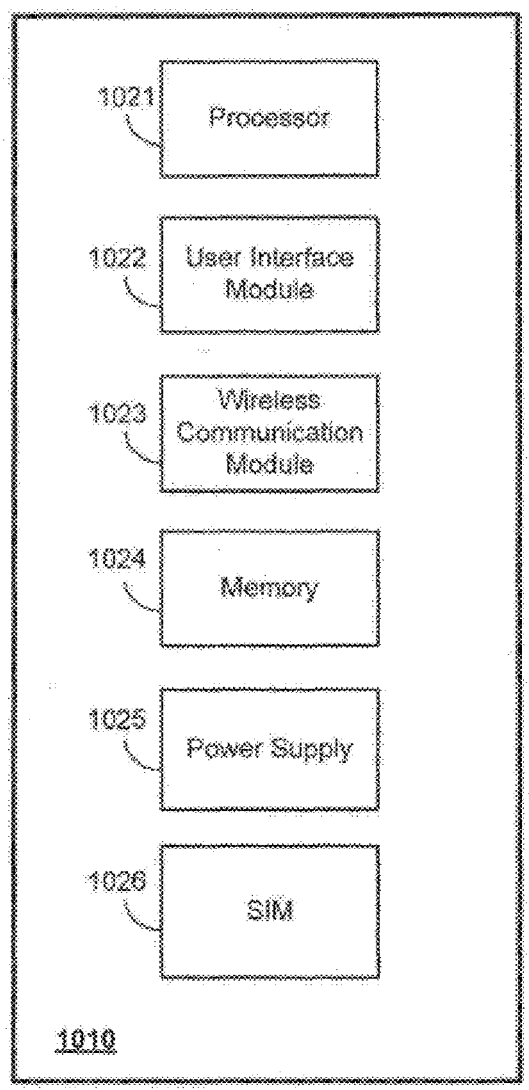
FIG. 4 is a schematic diagram of a wireless device that may be used in connection with an embodiment.

FIG. 4 illustrates an example wireless device 1010 that may be used in connection with an embodiment. References will also be made to other figures of the present disclosure as appropriate. For example, mobile devices (e.g. MS 120 and 121) may be wireless devices of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one embodiment, processor 1021 executes software (i.e., computer readable instructions stored in a computer readable medium) that may include functionality related to intelligent peer-to-peer management, for example. User interface module 1022 may be any type or combination of hardware and/or software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transmitter, receiver, or transceiver including hardware or a combination of hardware and/or software that enables wireless device 1010 to communicate with cellular network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
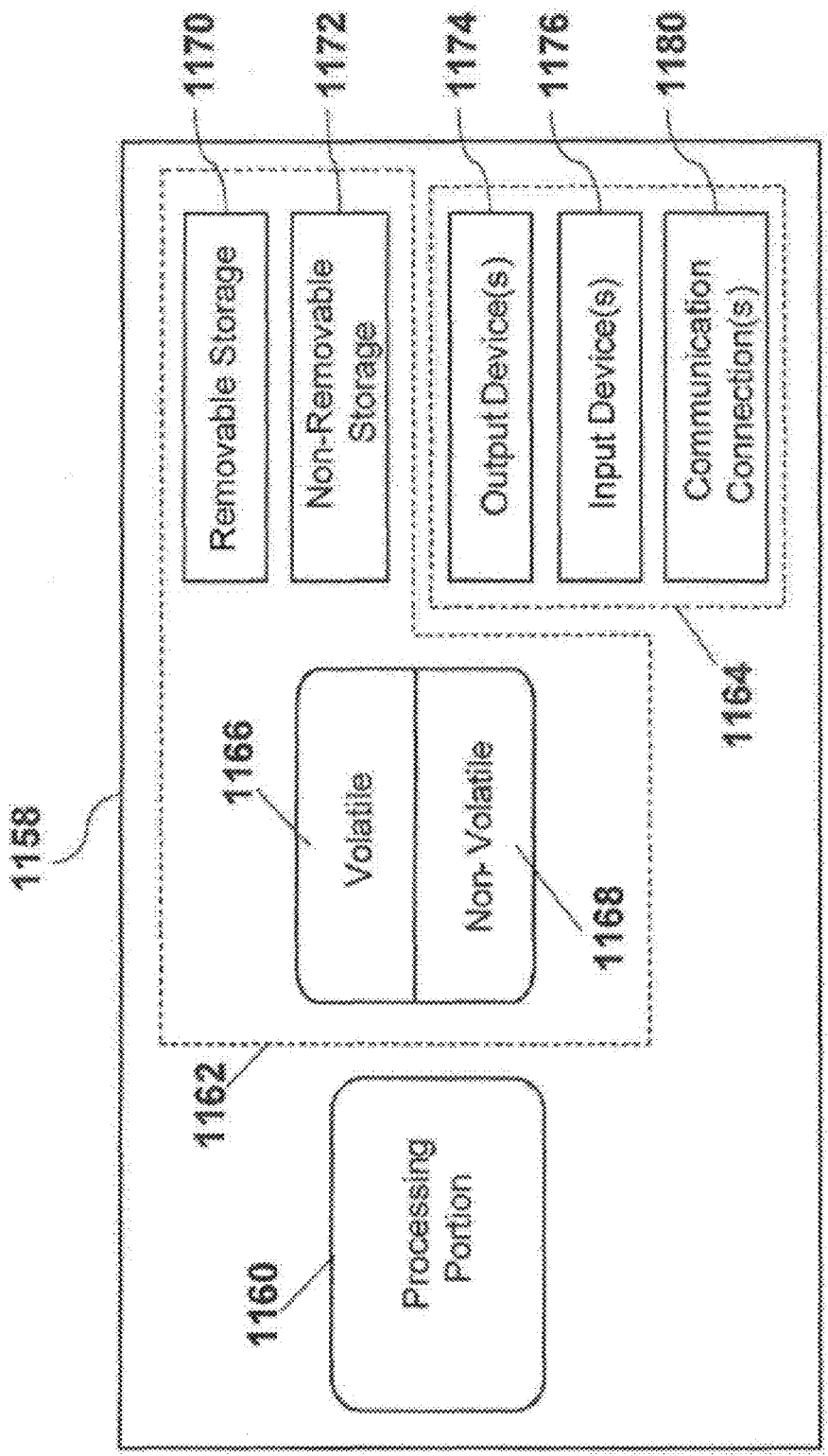
FIG. 5 is a block diagram of an exemplary processor which may be employed in an embodiment.

FIG. 5 is a block diagram of an example processor 1158 which may be employed in any of the embodiments described herein, including as one or more components of MS 120 and 121, as one or more components of network equipment such as MMEs, and HSSs, and/or CMS, or any other component of the outside networks 141 and 142, and/or any related equipment, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for intelligent peer-to peer communications, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158. It is to be understood that a computer storage medium, as described herein, is not to be construed as a transient signal.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. It is to be understood, however, that a computer-readable storage medium, as described herein, is not to be construed as a transient signal. The processor 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how intelligent peer-to-peer management may be implemented with stationary and non-stationary network structures and architectures in order to do intelligent peer-to-peer management. It can be appreciated, however, that intelligent peer-to-peer management as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD- SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, intelligent peer-to-peer management may be applied independently of the method of data transport.

Embodiments disclosed herein may allow for communications single and network service provider networks. P2P notification messages may be sent across the network(s) from a P2P end device to another P2P end device to query communication availability of a P2P end device. Communication availability may include uptime, bandwidth resources of for uplink and downlink communication, and the like.

Figure 6:
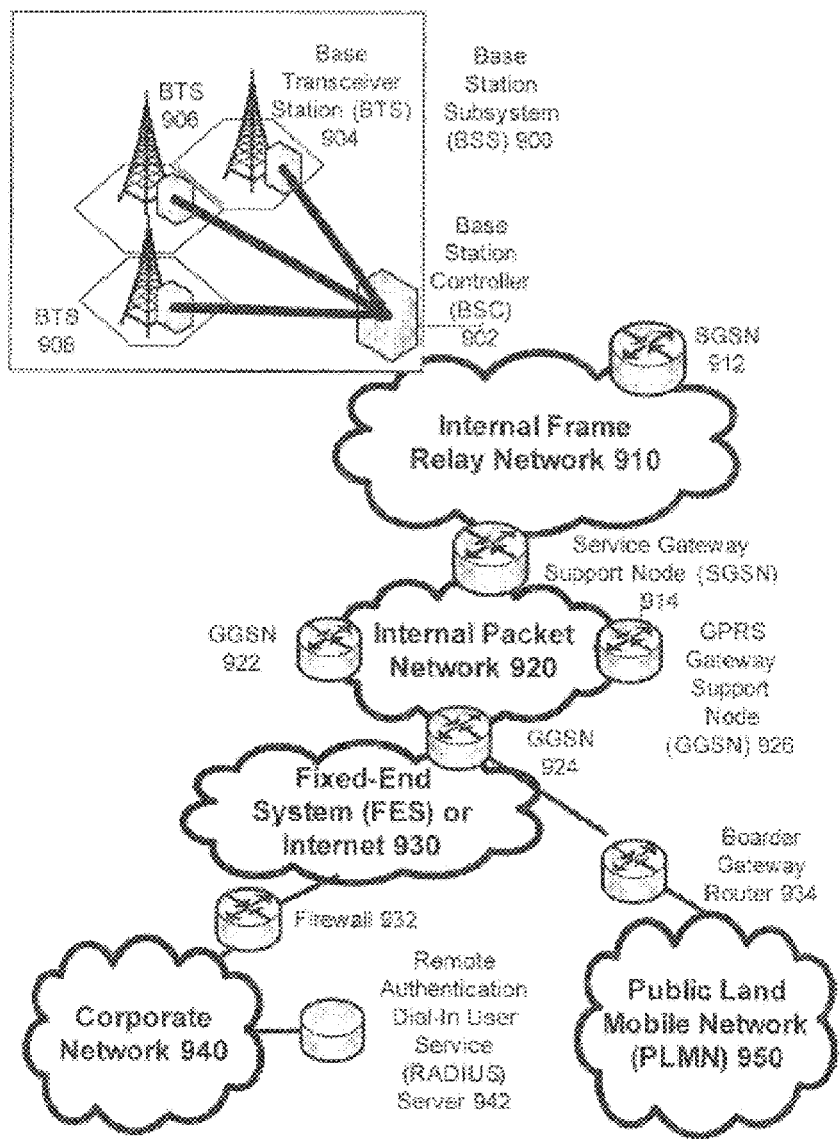
FIG. 6 is an overall block diagram of an exemplary packet-based mobile cellular network environment, such as a GPRS network, in which the present subject matter may be implemented.

FIG. 6 depicts an overall block diagram of an exemplary packet-based mobile cellular network environment, such as a GPRS network, in which intelligent peer-to-peer management systems and methods such as those described herein may be practiced. In an example configuration, any RAN as described herein may be encompassed by or interact with the network environment depicted in FIG. 6. Similarly, MS 120 and 121 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., MS 120, 121 and 122) become connected to the cellular network. In exemplary fashion, the packet traffic originating from user devices (e.g., MS 120 and 121) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
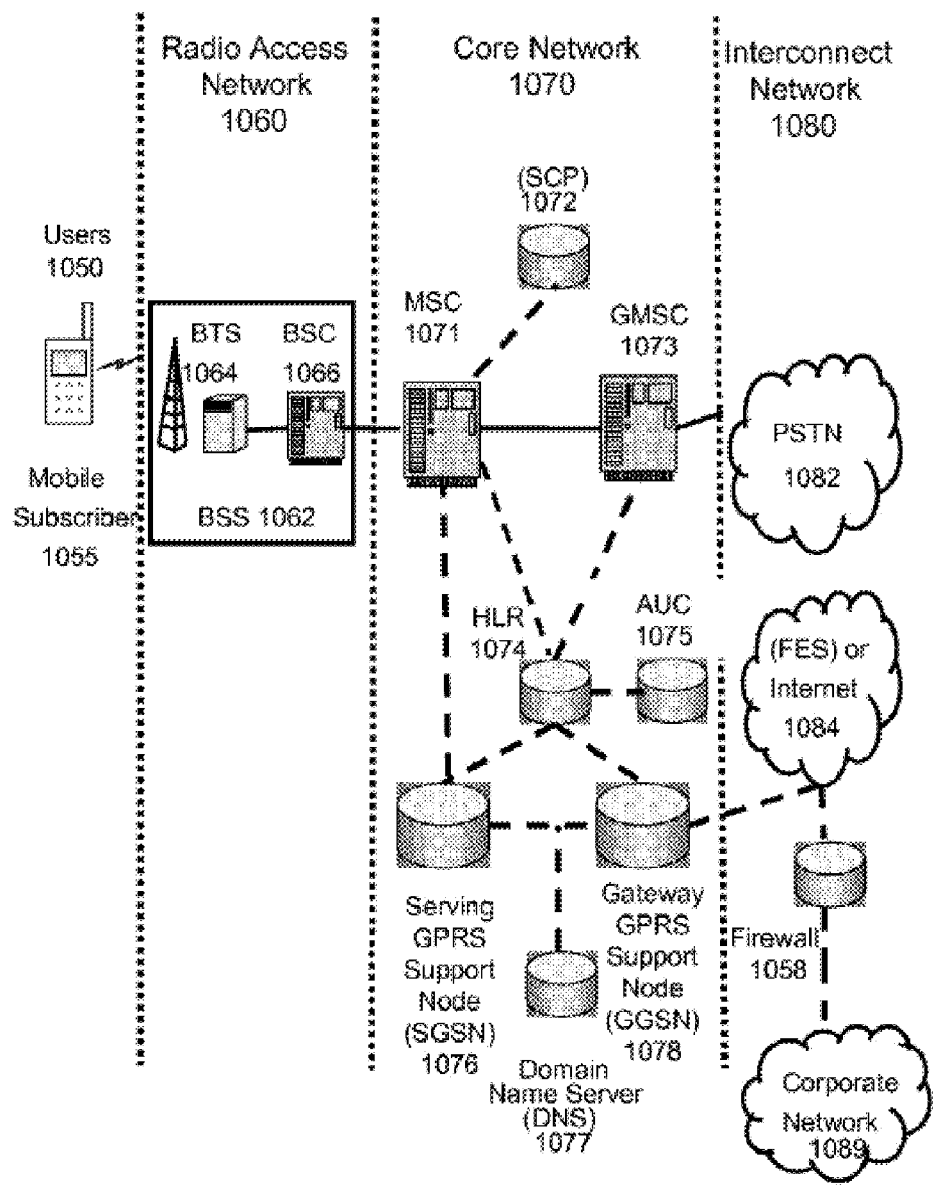
FIG. 7 illustrates a non-limiting, exemplary architecture of a typical GPRS network.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise any of MS 120 and 121. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as MS 120 and 121, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of intelligent peer-to-peer management systems and methods such as those described herein may include, but are not limited to, Gateway GPRS Support Node tables, Fixed End System router tables, firewall systems, VPN tunnels, and any number of other network elements as required by the particular digital network.

Figure 8:
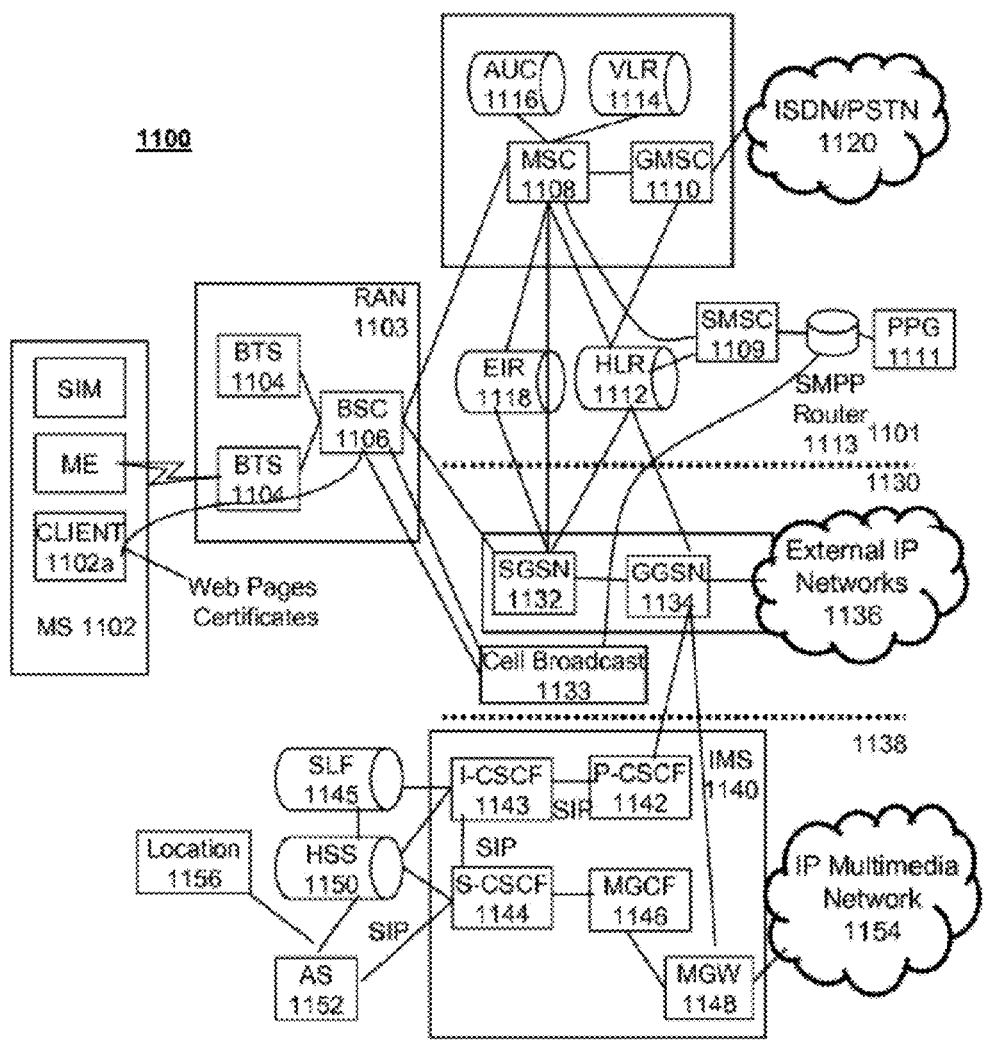
FIG. 8 illustrates a non-limiting alternate block diagram of an exemplary GSM/GPRS/IP multimedia network architecture in which the present subject matter may be implemented.

FIG. 8 illustrates another exemplary block diagram view of a GSM/GPRS/IP multimedia network architecture 1100 in which the systems and methods for intelligent peer-to-peer management such as those described herein may be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., MS 120 and 121) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and cellular networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the cellular network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 9:
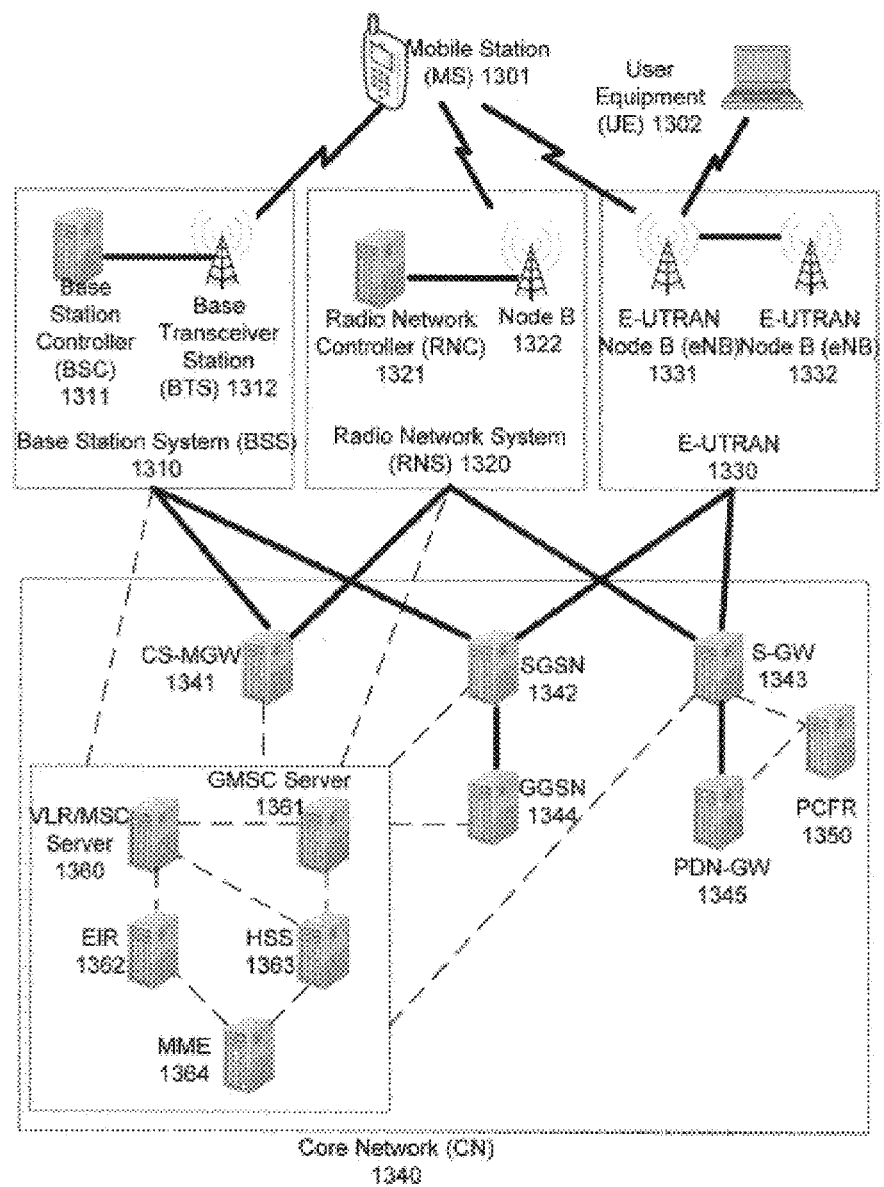
FIG. 9 illustrates a non-limiting PLMN block diagram view of an exemplary architecture in which one or more disclosed embodiments may be implemented.

FIG. 9 illustrates a PLMN block diagram view of an exemplary architecture in which initiation of a call to an emergency call center may be incorporated. Mobile Station (MS) 1301 is the physical equipment used by the PLMN subscriber. In one illustrative embodiment, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical embodiment, user equipment may be classified as either "white listed" or "black listed" depending on its status in the network. In one embodiment, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

The terminology used herein is for the purpose of describing particular embodiments only and is not intended to be limiting of the invention. Where the definition of terms departs from the commonly used meaning of the term, applicant intends to utilize the definitions provided herein, unless specifically indicated. The singular forms "a", "an" and "the" are intended to include the plural forms as well, unless the context clearly indicates otherwise. It will be understood that, although the terms first, second, etc. may be used to describe various elements, these elements should not be limited by these terms. These terms are only used to distinguish one element from another. The term "and/or" includes any, and all, combinations of one or more of the associated listed items. The phrases "coupled to" and "coupled with" contemplates direct or indirect coupling.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements.

What is claimed:

1. A method comprising:
   receiving in a radio access network a request to transmit a message from a first device through a cellular network to a second device, the request including a machine identity for the first device and not including any QoS parameters;
   submitting a query to a database in a core network that correlates the machine identity with an associated QoS parameter;
   determining the associated QoS parameter associated with the first device based on the machine identity;
   assigning an assigned priority to the message, the assigned priority selected from at least a high priority and a low priority based on the associated QoS parameter; and
   assigning the message, based on the assigned priority to one of a first input queue or a second input queue located in the radio access network wherein the first input queue is associated with the low priority and a long delay and the second input queue is associated with the high priority and a short delay;
   transmitting messages in the second input queue on a first come first served basis; and
   transmitting messages in the first input queue on a first come first served basis; after the messages in the second input queue have been transmitted.

2. The method of claim 1 wherein the associated QoS parameter is latency.

3. The method of claim 2 wherein assigning the message, based on the assigned priority further comprises assigning the message based on the assigned priority to one of a first input queue, a second input queue or a third input queue wherein the first input queue is associated with the low priority and a long delay and the second input queue is associated with the high priority and a short delay and the third input queue is associated with a medium priority and a medium delay.

4. The method of claim 1 further comprising holding the message in an assigned input queue until all messages of higher priority have been transmitted.

5. The method of claim 1 wherein messages in the second input queue have low latency and messages in the first input queue have higher latency.

6. The method of claim 1 wherein the first input queue and the second input queue are located in a eNode B access point.

7. A system comprising:
   a radio access network;
   a core network connected to the radio network;
   a node in a radio network that receives a request to transmit a message from a first device, the request including a machine identity for the first device and not including any QoS parameters;
   a subsystem that determines the machine identity for the first device;
   a storage medium in the core network;
   a database stored in the storage medium that stores information associating the machine identity with an associated QoS parameter;
   a subsystem in the core network that determines the associated QoS parameter for the first device based on the machine identity;
   a subsystem in the core network that assigns an assigned priority for the message based on the associated QoS parameter, the assigned priority selected from among a high priority and a low priority;
   a subsystem, located in the radio access network, having a first input queue and a second input queue wherein the first input queue is associated with the low priority and a long delay, and the second input queue is associated with the high priority and a short delay;

a subsystem that assigns the message to one of the first input queue or the second input queue in the radio network based on the assigned priority;

a subsystem that transmits messages in the second input queue on a first in first out basis; and a subsystem that transmits messages in the first input queue on a first in first out basis after the messages in the first input queue have been transmitted.

8. The system of claim 7 wherein the associated QoS parameter is latency.

9. The system of claim 8 further comprising a third input queue associated with a medium delay.

10. The system of claim 7 wherein the subsystem that transmits messages in the first input queue transmits messages in the first input queue, before the subsystem that transmits messages in the second input queue transmits messages in the second input queue.

11. The system of claim 7 wherein the messages in the first input queue have low latency and the messages in the second input queue have higher latency.

12. The system of claim 7 wherein the first input queue and the second input queue are located in an eNode B access point.

* * * * *